United States Patent [19]
Hardin

[11] Patent Number: 6,070,926
[45] Date of Patent: Jun. 6, 2000

[54] TRUCK BED EXTENDER SYSTEM

[76] Inventor: Charles Winifred Hardin, 9105 Eastway Dr., Orange, Tex. 77630

[21] Appl. No.: 09/206,089

[22] Filed: Dec. 4, 1998

[51] Int. Cl.$^7$ ..................................................... B62C 1/06
[52] U.S. Cl. ....................... 296/26.08; 224/518; 224/519; 224/521
[58] Field of Search ................ 296/26.08; 224/518, 224/519, 521

[56] References Cited

U.S. PATENT DOCUMENTS

| | | | |
|---|---|---|---|
| 2,401,388 | 6/1946 | Striker | 224/518 |
| 3,039,634 | 6/1962 | Hobson et al. | 224/508 |
| 4,856,686 | 8/1989 | Workentine | 224/521 |
| 4,856,840 | 8/1989 | Hanley | 296/26 |
| 5,451,088 | 9/1995 | Broad | 296/26.08 |
| 5,458,389 | 10/1995 | Young | 296/26.08 |
| 5,497,927 | 3/1996 | Peterson | 224/519 |
| 5,501,500 | 3/1996 | Cannon | 296/26 |
| 5,649,656 | 7/1997 | Davy | 224/521 |
| 5,658,033 | 8/1997 | Delaune | 296/26 |
| 5,678,743 | 10/1997 | Johnson et al. | 296/26.08 |
| 5,803,330 | 9/1998 | Stack et al. | 224/519 |
| 5,938,092 | 8/1999 | Johnson | 296/26.08 |
| 5,950,890 | 9/1999 | Darby | 224/519 |

*Primary Examiner*—Joseph D. Pape
*Assistant Examiner*—Kiran Patel
*Attorney, Agent, or Firm*—Joseph N. Breaux

[57] ABSTRACT

A truck bed extender system that is attachable to a truck using the receiver of the truck receiver hitch that includes multiple height and width adjustable supports that are positioned by the user to desired positions and heights to provide support where needed.

1 Claim, 2 Drawing Sheets

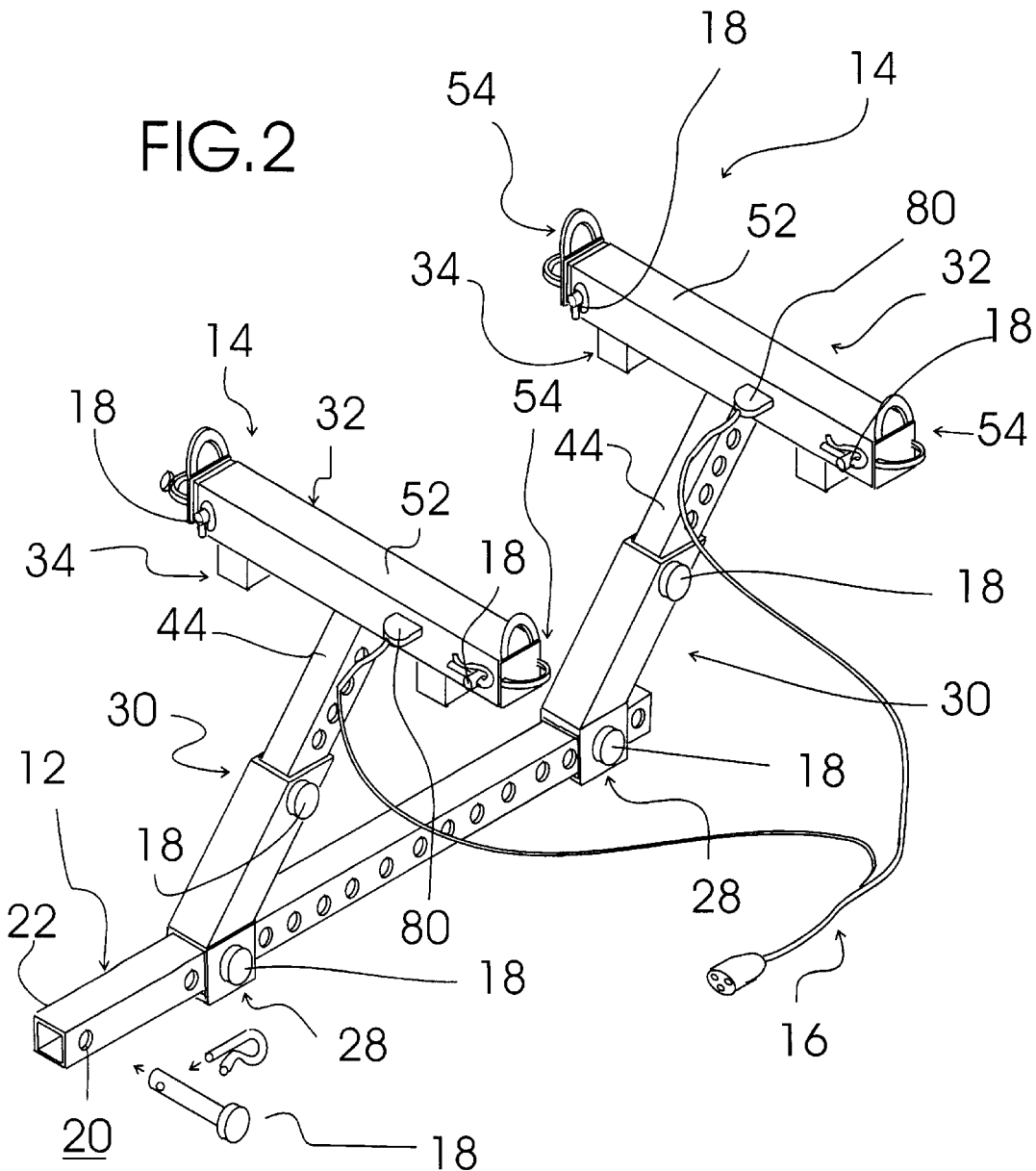

TRUCK BED EXTENDER SYSTEM

TECHNICAL FIELD

The present invention relates to truck bed extenders and more particularly to a truck bed extender system that is attached to the truck using the receiver of the truck receiver hitch; the truck bed extender system including a receiver hitch insertable horizontal support bar, two identical adjustable length and width support assemblies, and a brake light connecting cable; the receiver hitch insertable horizontal support bar including a receiver connecting aperture at a first end thereof and a number of pairs of spaced vertical support assembly connecting apertures at a second end thereof; the two identical adjustable length and width support assemblies each including a horizontal support bar fastening base having a keyed passageway through which the second end of the horizontal support bar is positionable and a pair of concentric base securing apertures that are alignable with a pair of the number of pairs of spaced vertical support assembly connecting apertures, an angled, adjustable length vertical support secured at a base end of a bottom member thereof to the horizontal support bar fastening base and having a top member slidably positionable and lockable with respect to the bottom member, a load support arm assembly secured at a midpoint of a two ended center member thereof to the top member of the vertical support and including two length adjustable extensions, one adjustably securable in connection with each end of the two ended center member, each adjustable extension being provided with a pair of tie rings formed in connection with a stop plate, and a dual brake light system that is carried on the two ended center member and including an electrical attachment socket and two brake light housings; the brake light connecting cable including two brake light plugs, one attachable to the electrical attachment socket of each dual brake light system, that are in electrical connection with a vehicle brake light system connector.

BACKGROUND ART

It is often necessary to carry long items in the bed of a pickup truck, such as electrical conduit, lengths of plastic pipe, and long boards, that extend out past the tail gate of the bed. It would be a benefit, therefore, to have a bed extender system that could be used to provide support to the ends of these items to prevent damage to the items caused by bouncing up and down. Because some long items can need more than one support to prevent damage from bouncing up and down, it would be a further benefit to have a bed extender system that included multiple height and width adjustable supports that could be positioned by the user to desired positions and heights to provide support where needed. Because the bed extender could be needed at various times, it would be a benefit to have a bed extender system that could be rapidly attached to the truck when needed and rapidly removed when not needed.

GENERAL SUMMARY DISCUSSION OF INVENTION

It is thus an object of the invention to provide a truck bed extender system that includes a support for supporting the ends of items extending past the tail gate of a pickup truck bed.

It is a further object of the invention to provide a truck bed extender system that includes multiple height and width adjustable supports that are positioned by the user to desired positions and heights to provide support where needed.

It is a still further object of the invention to provide a truck bed extender system that is rapidly attachable to a pickup truck when needed.

It is a still further object of the invention to provide a truck bed extender system that includes a receiver hitch insertable horizontal support bar, two identical adjustable length and width support assemblies, and a brake light connecting cable; the receiver hitch insertable horizontal support bar including a receiver connecting aperture at a first end thereof and a number of pairs of spaced vertical support assembly connecting apertures at a second end thereof; the two identical adjustable length and width support assemblies each including a horizontal support bar fastening base having a keyed passageway through which the second end of the horizontal support bar is positionable and a pair of concentric base securing apertures that are alignable with a pair of the number of pairs of spaced vertical support assembly connecting apertures, an angled, adjustable length vertical support secured at a base end of a bottom member thereof to the horizontal support bar fastening base and having a top member slidably positionable and lockable with respect to the bottom member, a load support arm assembly secured at a midpoint of a two ended center member thereof to the top member of the vertical support and including two length adjustable extensions, one adjustably securable in connection with each end of the two ended center member, each adjustable extension being provided with a pair of tie rings formed in connection with a stop plate, and a dual brake light system that is carried on the two ended center member and including an electrical attachment socket and two brake light housings; the brake light connecting cable including two brake light plugs, one attachable to the electrical attachment socket of each dual brake light system, that are in electrical connection with a vehicle brake light system connector.

It is a still further object of the invention to provide a truck bed extender system that accomplishes all or some of the above objects in combination.

Accordingly, a truck bed extender system is provided. The truck bed extender system includes a receiver hitch insertable horizontal support bar, two identical adjustable length and width support assemblies, and a brake light connecting cable; the receiver hitch insertable horizontal support bar including a receiver connecting aperture at a first end thereof and a number of pairs of spaced vertical support assembly connecting apertures at a second end thereof; the two identical adjustable length and width support assemblies each including a horizontal support bar fastening base having a keyed passageway through which the second end of the horizontal support bar is positionable and a pair of concentric base securing apertures that are alignable with a pair of the number of pairs of spaced vertical support assembly connecting apertures, an angled, adjustable length vertical support secured at a base end of a bottom member thereof to the horizontal support bar fastening base and having a top member slidably positionable and lockable with respect to the bottom member, a load support arm assembly secured at a midpoint of a two ended center member thereof to the top member of the vertical support and including two length adjustable extensions, one adjustably securable in connection with each end of the two ended center member, each adjustable extension being provided with a pair of tie rings formed in connection with a stop plate, and a dual brake light system that is carried on the two ended center member and including an electrical attachment socket and two brake light housings; the brake light connecting cable including two brake light plugs, one attachable to the electrical attachment socket of each dual brake light system, that are in electrical connection with a vehicle brake light system connector.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 2 is a perspective view of the exemplary truck bed extender system of FIG. 1 showing the horizontal support bar fastening bases of two adjustable length and width support assemblies positioned over and secured to the receiver hitch insertable horizontal support bar with two locking pin assemblies; the top member of each of the angled, adjustable length vertical supports secured at a selected height with locking pin assemblies; the two length adjustable extensions locked in place to a respective center member of each load support arm assembly by locking pin assemblies; and one of the two brake light plugs of the brake light connecting cable attached to the electrical attachment socket of each of the two dual brake light systems.

EXEMPLARY MODE FOR CARRYING OUT THE INVENTION

Figure 1:
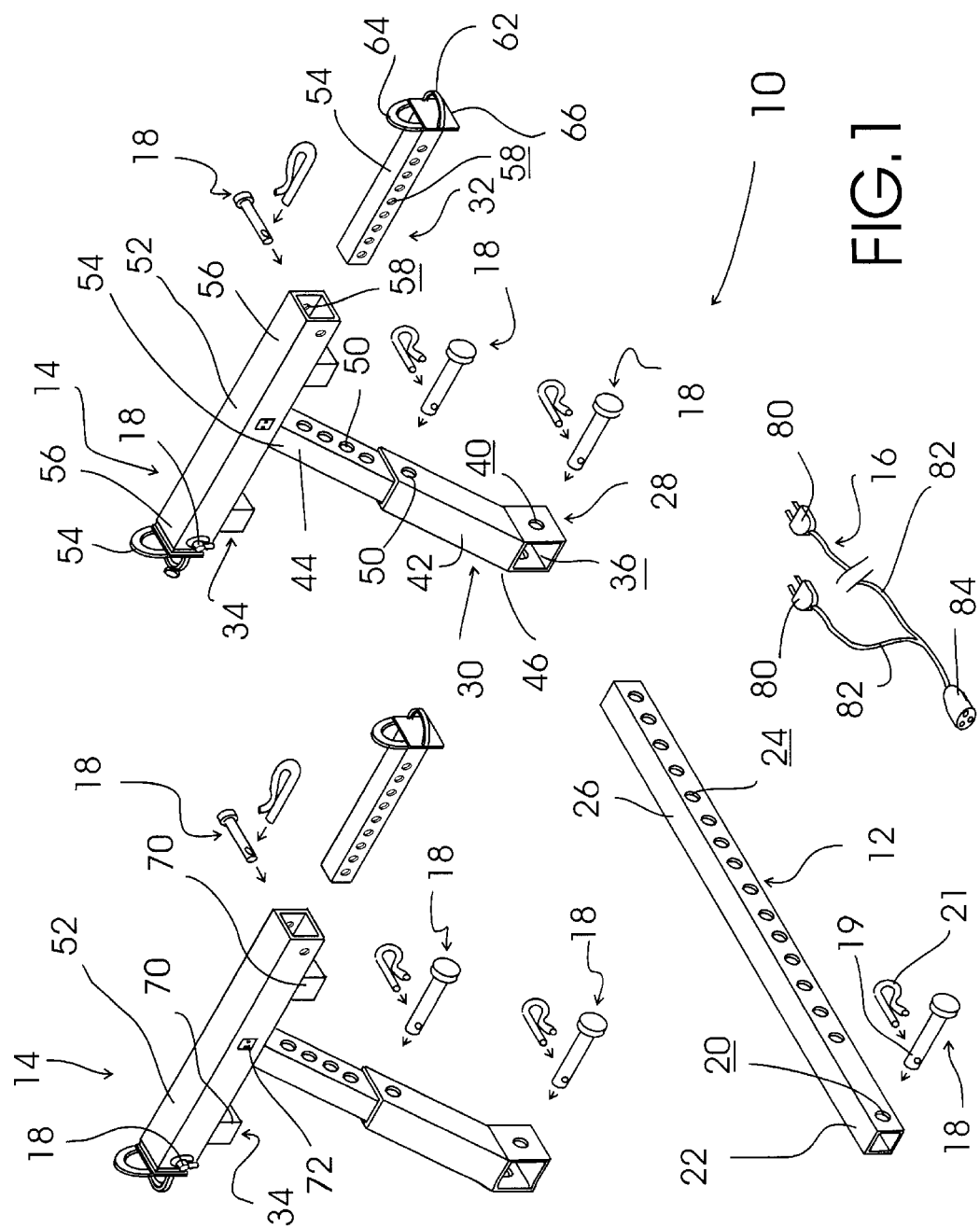
FIG. 1 is a perspective view of any exemplary embodiment of the truck bed extender system of the present invention showing the receiver hitch insertable horizontal support bar including the receiver connecting aperture at a first end thereof and a number of pairs of spaced vertical support assembly connecting apertures at a second end thereof; two identical adjustable length and width support assemblies each including a horizontal support bar fastening base having a keyed passageway through which the second end of the horizontal support bar is positionable and a pair of concentric base securing apertures that are alignable with a pair of the number of pairs of spaced vertical support assembly connecting apertures, an angled, adjustable length vertical support secured at a base end to the horizontal support bar fastening base and having a top member, a load support arm assembly secured at a midpoint of a center member thereof to the top member of the vertical support and including two length adjustable extensions, one adjustably securable in connection with each end of the center member, each adjustable extension being provided with a pair of tie rings formed in connection with a stop plate, and a dual brake light system carried on the center member and including an electrical attachment socket and two brake light housings; and a brake light connecting cable including two brake light plugs, one attachable to the electrical attachment socket of each dual brake light system, that are in electrical connection with a vehicle brake light system connector.

FIG. 1 shows an exemplary embodiment of the truck bed extender system of the present invention generally designated 10. Truck bed extender system 10 includes a receiver hitch insertable horizontal support bar, generally designated 12; two identical adjustable length and width support assemblies, generally designated 14; a brake light connecting cable, generally designated 16; and nine locking pin assemblies, generally designated 18, that each includes a locking pin 19 and a cotter pin 21. Receiver hitch insertable horizontal support bar 12 is constructed from a length of square profile metal tubing having a concentric pair of receiver connecting apertures 20 formed at a first end 22 thereof and a number of concentric pairs of spaced vertical support assembly connecting apertures 24 provided through and along a second end 26 thereof. Each of the two identical adjustable length and width support assemblies 14 includes a horizontal support bar fastening base, generally designated 28; an angled, adjustable length vertical support, generally designated 30; a load support arm assembly, generally designated 32; and a dual brake light system, generally designated 34. Horizontal support bar fastening base 28 is a section of square profile tubing having a square keyed passageway 36 having an inner dimension selected to allow insertion therethrough of receiver hitch insertable horizontal support bar 12 and a pair of concentric base securing apertures 40 that are alignable with a pair 24 of the number of pairs of spaced vertical support assembly connecting apertures 24 when second end of receiver hitch insertable horizontal support bar 12 is inserted into square keyed passageway 36.

Angled, adjustable length vertical support 30 includes a bottom member 42 and a top member 44 that are constructed from lengths of square profile tubing. Bottom member 42 has a base end 46 that is welded to horizontal support bar fastening base 28 at an angle. Top member 44 is slidably positionable and lockable with respect to bottom member 42 using locking apertures 50 and a locking pin assembly 18.

Load support arm assembly 32 includes a two ended center member 52 and two identical length adjustable extensions 54. Two ended center member 52 is welded at a midpoint thereof to a top end 54 of top member 44. Each of the two identical length adjustable extensions 54 is adjustably securable in connection with and end 56 of two ended center member 52 using locking pin apertures 58 and a locking pin assembly 18. Each adjustable extension 54 is provided with a pair of tie rings 62,64 formed in connection with a stop plate 66.

Dual brake light system 34 includes two plastic domed brake light housing assemblies 70 that are mechanically connected to two ended center member 52 and electrically connected with an electrical attachment socket 72. Brake light connecting cable 16 includes two brake light plugs 80 connected by cables 82 to a vehicle brake light system connector 84. Each of the two brake light plugs 80 is attachable to the electrical attachment socket 72 of each dual brake light system 34.

With reference to FIG. 2, truck bed extender system 10 is attached to the receiver of the receiver hitch of a truck by inserting first end 22 of the receiver hitch insertable horizontal support bar 12 into the receiver and locking it in connection therewith using a locking pin assembly 18 and receiver connecting apertures 20. The truck bed extender system 10, is then adjusted for use by positioning and securing the horizontal support bar fastening bases 28 of the two adjustable length and width support assemblies 14 over and to the receiver hitch insertable horizontal support bar 12 with two locking pin assemblies 18; securing the top member 44 of each of the angled, adjustable length vertical supports 30 at a selected height with locking pin assemblies 18; adjusting and locking to the two length adjustable extensions 54 with respect to a respective center member 52 of each load support arm assembly 32 using locking pin assemblies 18; and plugging one of the two brake light plugs of brake light connecting cable 16 into each of the electrical attachment socket 72 (FIG. 1) of each of the two dual brake light systems 34.

It can be seen from the preceding description that a truck bed extender system has been provided that includes a support for supporting the ends of items extending past the tail gate of a pickup truck bed; that includes multiple height and width adjustable supports that are positioned by the user to desired positions and heights to provide support where needed; that is rapidly attachable to a pickup truck when needed; and that includes a receiver hitch insertable horizontal support bar, two identical adjustable length and width support assemblies, and a brake light connecting cable; the receiver hitch insertable horizontal support bar including a receiver connecting aperture at a first end thereof and a number of pairs of spaced vertical support assembly connecting apertures at a second end thereof; the two identical adjustable length and width support assemblies each including a horizontal support bar fastening base having a keyed passageway through which the second end of the horizontal support bar is positionable and a pair of concentric base securing apertures that are alignable with a pair of the number of pairs of spaced vertical support assembly connecting apertures, an angled, adjustable length vertical support secured at a base end of a bottom member thereof to the horizontal support bar fastening base and having a top member slidably positionable and lockable with respect to the bottom member, a load support arm assembly secured at a midpoint of a two ended center member thereof to the top member of the vertical support and including two length adjustable extensions, one adjustably securable in connection with each end of the two ended center member, each adjustable extension being provided with a pair of tie rings formed in connection with a stop plate, and a dual brake light system that is carried on the two ended center member and including an electrical attachment socket and two brake light housings; the brake light connecting cable including two brake light plugs, one attachable to the electrical attachment socket of each dual brake light system, that are in electrical connection with a vehicle brake light system connector.

It is noted that the embodiment of the truck bed extender system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A truck bed extender system comprising:

a receiver hitch insertable horizontal support bar;

two identical adjustable length and width support assemblies; and a brake light connecting cable;

said receiver hitch insertable horizontal support bar including a receiver connecting aperture at a first end thereof and a number of pairs of spaced vertical support assembly connecting apertures at a second end thereof;

said two identical adjustable length and width support assemblies each including a horizontal support bar fastening base having a keyed passageway through which said second end of said horizontal support bar is positionable and a pair of concentric base securing apertures that are alignable with a pair of said number of pairs of spaced vertical support assembly connecting apertures, an angled, adjustable length vertical support secured at a base end of a bottom member thereof to said horizontal support bar fastening base and having a top member slidably positionable and lockable with respect to said bottom member, a load support arm assembly secured at a midpoint of a two ended center member thereof to said top member of said vertical support and including two length adjustable extensions, one adjustably securable in connection with each end of said two ended center member, each adjustable extension being provided with a pair of tie rings formed in connection with a stop plate, and a dual brake light system that is carried on said two ended center member and including an electrical attachment socket and two brake light housings;

said brake light connecting cable including two brake light plugs, one attachable to said electrical attachment socket of each dual brake light system, that are in electrical connection with a vehicle brake light system connector.

* * * * *